United States Patent
Strater

(10) Patent No.: US 8,891,506 B2
(45) Date of Patent: Nov. 18, 2014

(54) METHOD AND APPARATUS FOR PROVIDING MOBILE IP SERVICE THROUGH A NETWORK ADDRESS TRANSLATION GATEWAY

(75) Inventor: Jay Strater, Jamison, PA (US)

(73) Assignee: Motorola Mobility LLC, Libertyville, IL (US)

( * ) Notice: Subject to any disclaimer, the term of this patent is extended or adjusted under 35 U.S.C. 154(b) by 465 days.

(21) Appl. No.: 11/460,140

(22) Filed: Jul. 26, 2006

(65) Prior Publication Data

US 2008/0025325 A1 Jan. 31, 2008

(51) Int. Cl.
*H04J 3/24* (2006.01)
*H04W 8/06* (2009.01)
*H04L 29/12* (2006.01)
*H04W 80/04* (2009.01)
*H04W 8/24* (2009.01)

(52) U.S. Cl.
CPC ......... *H04L 29/12452* (2013.01); *H04W 80/04* (2013.01); *H04W 8/06* (2013.01); *H04L 61/2546* (2013.01); *H04W 8/24* (2013.01)
USPC .......................................... 370/349; 370/352

(58) Field of Classification Search
USPC ............. 370/349, 400, 401; 455/432.1, 435.1
See application file for complete search history.

(56) References Cited

U.S. PATENT DOCUMENTS

| | | | |
|---|---|---|---|
| 6,163,843 A | 12/2000 | Inoue et al. | |
| 6,298,063 B1 * | 10/2001 | Coile et al. | 370/401 |
| 6,507,908 B1 * | 1/2003 | Caronni | 713/153 |
| 6,728,536 B1 * | 4/2004 | Basilier et al. | 455/432.1 |
| 6,985,479 B2 * | 1/2006 | Leung et al. | 370/352 |
| 7,068,640 B2 * | 6/2006 | Kakemizu et al. | 370/349 |
| 7,149,229 B1 * | 12/2006 | Leung | 370/466 |
| 7,342,894 B2 * | 3/2008 | Abrol et al. | 370/254 |
| 7,356,020 B2 * | 4/2008 | O'Neill | 370/349 |
| 2002/0018456 A1 * | 2/2002 | Kakemizu et al. | 370/338 |

OTHER PUBLICATIONS

PCT Search Report and Written Opinion, PCT/US2007/71724, Dated Jul. 21, 2008.

* cited by examiner

*Primary Examiner* — Brian O'Connor
(74) *Attorney, Agent, or Firm* — Lerner, David, Littenberg, Krumholz & Mentlik, LLP

(57) ABSTRACT

Method and apparatus for providing Mobile internet protocol (IP) service through a network address translation gateway. In one example, a gateway between a local area network (LAN) and a wide area network (WAN) is provided. A foreign agent (FA) module is configured to advertise a care-of address (CoA) on the LAN and process registration and mobile IP communication traffic on the LAN and the WAN side of the gateway. A control module is configured to identify the registration and the mobile IP communication traffic on the LAN and the WAN. The control module sends mobile IP traffic to the FA and other traffic to a network address translation (NAT) module. In this manner, network address translation of mobile IP traffic is advantageously omitted. This allows the IP-in-IP tunnels used by mobile IP to pass through the gateway.

19 Claims, 2 Drawing Sheets

METHOD AND APPARATUS FOR PROVIDING MOBILE IP SERVICE THROUGH A NETWORK ADDRESS TRANSLATION GATEWAY

BACKGROUND OF THE INVENTION

1. Field of the Invention

The present invention relates generally to packet network communication and routing and, more particularly, to a method and apparatus for providing Mobile internet protocol (IP) service through a network address translation gateway.

2. Description of the Background Art

Mobile internet protocol (IP) is an Internet Engineering Task Force (IETF) standard communications protocol that is designed to allow mobile device users to move from one network to another while maintaining the same IP address. Mobile IP is described in IETF RFC 3344, published August 2002 and incorporated by reference herein. Mobile IP provides an efficient, scalable mechanism for node mobility within the Internet. Using Mobile IP, nodes may change their point-of-attachment to the Internet without changing their IP address, which allows them to maintain transport and higher-layer connections while moving. As such, Mobile IP is a core technology that the cellular community plans on utilizing to allow mobile devices, such as, cell phones, personal digital assistants and wireless lap tops, to move seamlessly from one IP network to another.

Mobile IP utilizes home agents (HAs) and foreign agents (FAs), or HAs and a mobile node with Collocated Care of Address (CCOA) element. An HA is a router on a mobile node's home network which tunnels datagrams for delivery to the mobile node when it is away from home, and maintains current location information for the mobile node. A FA is a router on a mobile node's visited network which provides routing services to the mobile node while registered. The FA detunnels and delivers datagrams to the mobile node that were tunneled by the mobile node's home agent. For datagrams sent by a mobile node, the FA may serve as a default router for registered mobile nodes. A mobile node's CCOA provides the same function as an FA, but resides within the mobile node. Either FA or mobile node CCOA are used along with a HA.

When a mobile node detects that it has moved to a foreign network, it obtains a care-of address (COA) on the foreign network. The care-of address can be determined from FA or CCOA, depending in on which is being used. The mobile node operating away from home then registers its new care-of address with its HA through exchange of a Registration Request and Registration Reply message with it, possibly via a FA (if used). Datagrams sent to the mobile node's home address are intercepted by its HA, tunneled by the HA to the mobile node's COA, received at the tunnel endpoint (either at a FA or mobile node's CCOA), and finally delivered to the mobile node.

A basic assumption that Mobile IP makes is that FA or CCOA are uniquely identifiable by a globally routable IP address. This assumption breaks down when a mobile device attempts to communicate from behind a network address translation (NAT) gateway. Typically most home routers, wireless or otherwise, employ NATs (gateway router). IP devices which communicate from behind a NAT are reachable only through the NAT's public address or addresses. Mobile IP relies on sending traffic via IP-in-IP tunneling; however, IP-in-IP tunneling does not generally contain enough information to permit unique translation from common public addresses to particular care-of addresses (CoA) of an FA or CCOA which resides behind the NAT. In particular there are no transmission control protocol (TCP) or user datagram protocol (UDP) port numbers available for a NAT to work with. Therefore, IP-in-IP tunnels used by mobile IP generally cannot pass through a NAT.

Therefore, a need exists for a cost-effective method and apparatus for providing mobile IP service through a NAT gateway.

SUMMARY OF THE INVENTION

Method and apparatus for providing Mobile internet protocol (IP) service through a network address translation gateway. In one embodiment, a gateway between a local area network (LAN) and a wide area network (WAN) is provided. The gateway includes a foreign agent (FA) module, a control module, and a network address translation (NAT) module. The FA module is configured to advertise a care-of address (CoA) on the LAN and process registration and post-registration mobile IP traffic on the LAN and the WAN side of the gateway. The control module is configured to identify the registration and the post-registration mobile IP traffic on the LAN and the WAN to omit network address translation of this traffic during the processing thereof by the FA module.

Another aspect of the invention relates to a method of providing a gateway between a local area network and a wide area network. The gateway includes a foreign agent module and a network address translation module. Packets received from the wide area network and the local area network are inspected to identify whether each of the packets is registration mobile internet protocol (IP) traffic, mobile IP communication traffic, or other traffic. The registration mobile IP traffic and the mobile IP communication traffic are processed via the foreign agent module. The other traffic is processed via the network address translation module. In this manner, network address translation of mobile IP traffic is advantageously omitted. This allows the IP-in-IP tunnels used by mobile IP to pass through the gateway.

Another aspect of the invention relates to a computer readable medium having processor-executable instructions for performing a method of providing a gateway between a local area network and a wide area network. The gateway includes a foreign agent module and a network address translation module. Packets received from the wide area network and the local area network are inspected to identify whether each of the packets is registration mobile internet protocol (IP) traffic, mobile IP communication traffic, or other traffic. The registration mobile IP traffic and the mobile IP communication traffic are processed via the foreign agent module. The other traffic is processed via the network address translation module. In this manner, network address translation of mobile IP traffic is advantageously omitted. This allows the IP-in-IP tunnels used by mobile IP to pass through the gateway.

Accordingly, packets received by the gateway are inspected to identify whether each packet is mobile IP traffic or other traffic. Mobile IP traffic is processed by an FA module, and other traffic is processed by a NAT module. In this manner, network address translation of mobile IP traffic is advantageously omitted. This allows the IP-in-IP tunnels used by mobile IP to pass through the gateway.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
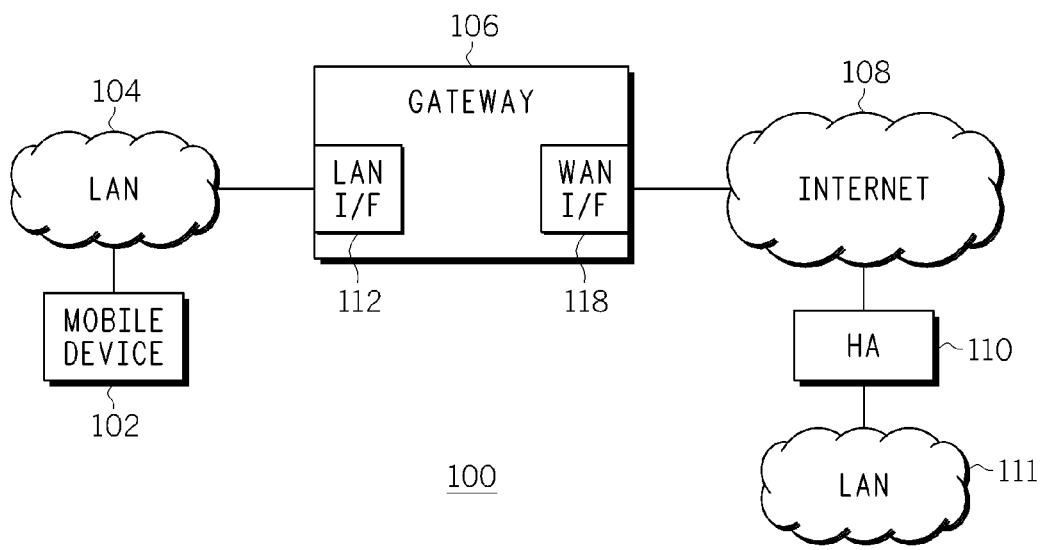
FIG. 1 is a block diagram depicting an exemplary embodiment of a communication system.

FIG. 1 is a block diagram depicting an exemplary embodiment of a communication system 100. The system 100 includes a mobile device 102, a local area network (LAN) 104, a gateway 106, a wide area network (WAN) 108 (e.g., the Internet), and a home agent (HA) 110. The mobile device 102 may comprise a mobile telephone, personal digital assistant (PDA), laptop computer, or the like. In one embodiment, the LAN 104 comprises a wireless LAN (WLAN), such as an IEEE 802.11 type network or the like, and the mobile device 102 communicates with the LAN 104 using a wireless link. Alternatively, the LAN 104 may be a wired network, such as an Ethernet network or the like, and the mobile device 102 communicates with the LAN 104 using a wired link.

The gateway 106 is configured to provide an interface between the LAN 104 and the WAN 108. The gateway 106 may comprise a home router with or without wireless access point, or like type device. The gateway 106 includes a LAN interface (I/F) 112 configured for communication with the LAN 104, and a WAN I/F 118 configured for communication with the WAN 108. The gateway 106 facilitates communication between devices on the LAN 104, such as the mobile device 102, and devices on the WAN 108, such as the HA 110. The HA 110 may be further coupled to a LAN 111 (e.g., a wireless or wired LAN). The HA 110 may comprise a router or like type device.

Figure 2:
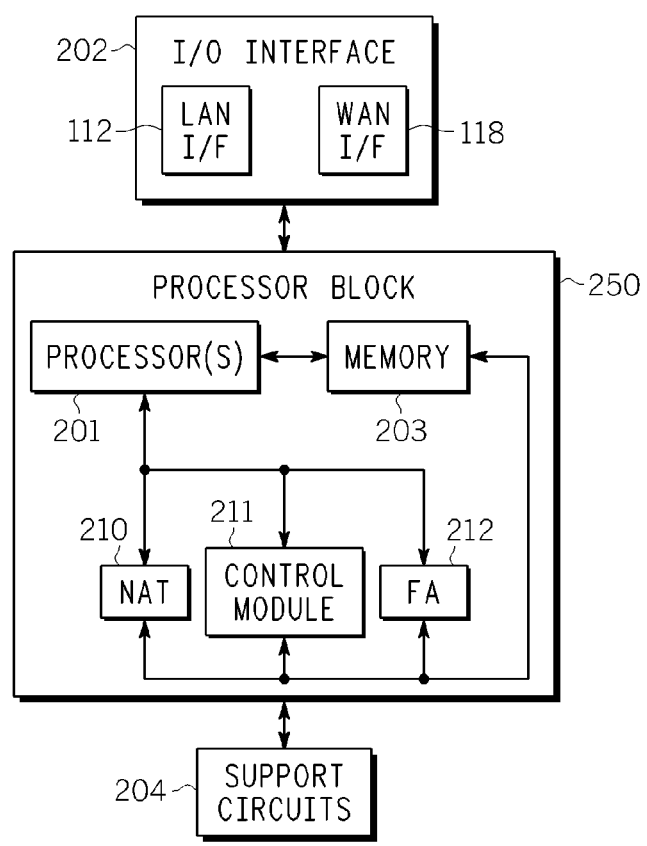
FIG. 2 is a block diagram depicting an exemplary embodiment of a gateway in accordance with one or more aspects of the invention.

FIG. 2 is a block diagram depicting an exemplary embodiment of the gateway 106 in accordance with one or more aspects of the invention. The gateway 106 includes a processor block 250 various support circuits 204, and an I/O interface 202. The processor block 250 includes one or more processors 201, a memory 203, a network address translation (NAT) module 210, a control module 211, and an foreign agent (FA) module 212. The processor(s) 201 may be any type of microprocessor(s) known in the art. The support circuits 204 for the processor block 250 include conventional cache, power supplies, clock circuits, data registers, I/O interfaces, and the like. The I/O interface 202 is coupled to the processor block 250 and includes the LAN I/F 112 and the WAN I/F 118.

The memory 203 may store processor-executable instructions and/or data for execution by and/or use by the processor(s) 201 as described further below. These processor-executable instructions may comprise hardware, firmware, software, and the like, or some combination thereof, and may implement the NAT module 210, the control module 211, and the FA module 212. The program instructions are configured to be executed by the processor 201 to cause the processor 201 to implement the functionalities of the modules 210, 211, and 212. The memory 203 may include one or more of the following random access memory, read only memory, magneto-resistive read/write memory, optical read/write memory, cache memory, magnetic read/write memory, and the like, as well as signal-bearing media as described below. Although one or more aspects of the invention are disclosed as being implemented as a processor executing a software program, those skilled in the art will appreciate that the invention may be implemented in hardware, software, or a combination of hardware and software. Such implementations may include a number of processors independently executing various programs and dedicated hardware, such as ASICs. In some embodiments, one or more of the functional modules 210, 211, and 212 are configured in the processor(s), rather than being stored in the memory 203 as program instructions.

Figure 3:
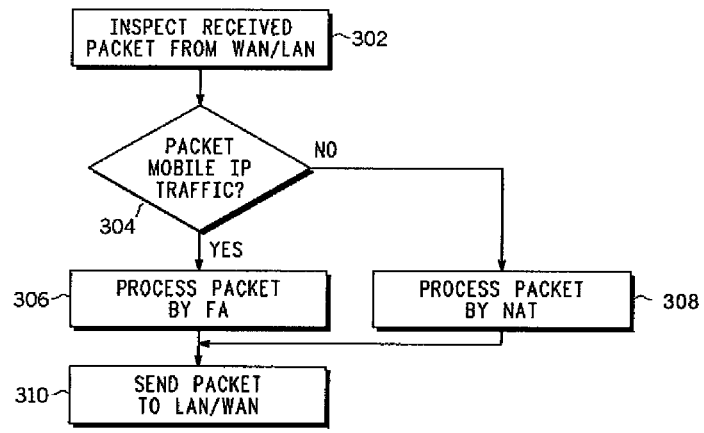
FIG. 3 is a flow diagram depicting an exemplary embodiment of a method for processing traffic in the gateway of FIG. 2 in accordance with one or more aspects of the invention.

FIG. 3 is a flow diagram depicting an exemplary embodiment of a method 300 for processing traffic in the gateway 106 in accordance with one or more aspects of the invention. With reference to FIGS. 1, 2, and 3, the mobile device 102 and the HA 110 are configured to implement the Mobile IP protocol as described above. That is, the mobile device 102 is identifiable by a home IP address provided by the HA 110, regardless of its current point of attachment. For example, the mobile device 102 uses the same home IP address if attached to its home network (i.e., the LAN 111) or a foreign network (e.g., the LAN 104). While situated away from the home network, the mobile device 102 is configured to obtain a care-of address (CoA) from the foreign network. The mobile device 102 is configured to monitor for agent advertisement messages to obtain a CoA within a foreign network and may optionally solicit such an agent advertisement message using an agent solicitation message. The mobile device 102 is configured to register its new CoA with the HA 110 through an exchange of registration request and registration reply messages. The HA 110 is configured to receive IP datagrams destined for the home IP address of the mobile device 102. The HA 110 is configured to tunnel the received IP datagrams to the CoA address of the mobile device 102 using an IP-in-IP encapsulation. In the reverse direction, the mobile device 102 may be configured to send IP datagrams to their destination using standard IP routing mechanisms. Alternatively, the mobile device 102 may be configured to employ reverse tunneling with the HA 110 (between FA module 212 and HA 110). In general, the mobile device 102 and the HA 110 are configured to operate as a mobile node and a home agent, respectively, defined in IETF RFC 3344.

The NAT module 210 is configured to provide network address translation for the gateway 106. As is well known in the art, NAT involves re-writing the source and/or destination addresses of IP packets as they pass through the gateway 106. The term "NAT" as used herein is meant to encompass both IP address translation and IP address translation combined with port translation (also referred to as NAPT). The NAT module 210 is further adapted to implement aspects of Mobile IP service, as described below.

The FA module 212 provides a foreign agent. Notably, the FA module 212 is configured to advertise its presence on the LAN 104 through the LAN I/F 112 using agent advertisement messages. The agent advertisement messages include a CoA address for use by mobile devices connected to the LAN 104. The FA module 212 uses a WAN-side IP address as the CoA address. In one embodiment, the COA address for the FA module 212 is the same address as the WAN address of the gateway 106. Alternatively, the CoA address of the FA module 212 may be a different IP address to provide an added level of traffic separation between traffic destined for the FA module 212 and standard WAN-side traffic for the gateway 106. If a unique WAN-side address is desired, the FA module 212 may obtain a WAN-side IP address using a WAN-side dynamic host configuration protocol (DHCP) or PPPoE (point-to-point protocol over Ethernet) client. Alternatively, a WAN-side IP address could be statically assigned as the CoA address.

The control module 211 is configured to classify traffic received via the LAN interface 112 and the WAN interface 118 for processing by either the FA module 212 or the NAT module 210. Steps performed by the control module 211 are shown in FIG. 3. At step 302, the control module 211 inspects a packet received from the LAN 104 and the WAN 108. The control module 211 identifies whether the packet is mobile IP traffic or other traffic. As described below, the Mobile IP traffic may include registration traffic or communication traffic. For Mobile IP traffic, the control module 211 classifies the traffic for processing by only the FA module 212. Processing of Mobile IP traffic by the NAT module 210 is omitted. For the other traffic, the control module 211 classifies the traffic for processing by the NAT module 210. Thus, at step 304, a determination is made whether the packet is mobile IP traffic. If so, the method 300 proceeds to step 306, where the packet is processed by the FA module 212. Otherwise, the method 300 proceeds to step 308, where the packet is processed by the NAT module 210. From steps 306 and 308, the method 300 proceeds to step 310, where the packet is sent via the WAN 108 or the LAN 104. The method 300 is repeated for each packet.

In this manner, network address translation for Mobile IP traffic is omitted. The control module 211 may be a separate module implemented by the gateway 106, as shown in FIG. 2. In one embodiment, the control module 211 comprises a filter module for filtering out Mobile IP traffic for processing by the FA module 212 and preventing processing by the NAT module 210. In another embodiment, rather than through a separate module, the function of the control module 211 is part of the NAT module 210 or the FA module 212.

The FA module 212 is further configured to support Mobile IP registration traffic between the mobile device 102 and the HA 110. The control module 211 is configured to pass the Mobile IP registration traffic to the FA module 212 while omitting processing by the NAT module 212. For registration request messages received at the LAN I/F 112, the FA module 212 receives the messages from the mobile device 102 and alters the source IP address and port of the received messages to correspond to the WAN interface for the FA module 212 (the WAN IP address being the CoA of the FA module 212). The FA module 212 records the original source IP address and port of the intercepted messages (i.e., the LAN interface of the mobile device 102). The FA module 212 then forwards the messages to the HA 110 out of the WAN I/F 118 without involving the function of the NAT 210 module.

In one embodiment, the control module 211 classifies LAN-side Mobile IP registration traffic based on destination port. In the Mobile IP protocol, the destination port for a registration request message is user datagram protocol (UDP) port number 434. The control module 211 forwards traffic having a UDP destination port number 434 to the FA module 212 to the exclusion of the NAT module 210.

For registration reply messages received at the WAN I/F 118, the control module 211 is configured to pass the Mobile IP registration traffic to the FA module 212 while omitting processing by the NAT module 212. The FA module 212 receives the messages from the HA 110, alters the destination IP address and port of the received messages to the LAN interface of the mobile device 102, which was received and recorded from the corresponding registration request message (the LAN IP address being the mobile device's home address). The FA module 212 then forwards the messages to the mobile device 102 out of the LAN I/F 112 without involving the function of the NAT 210 module.

In one embodiment, the control module 211 classifies WAN-side Mobile IP registration traffic (to be forwarded to the mobile device) based on destination port corresponding to the source port sent in the registration request from the FA module 212. The control module 211 forwards to the FA module 212 traffic received at the WAN I/F 118 with destination port corresponding to the source port sent in the registration request from the FA 212 to the exclusion of the NAT module 210 and the The FA module 212 is further configured to support Mobile IP communication traffic (bearer traffic) between the mobile device 102 and the HA 110. Again, the control module 211 is configured to pass the Mobile IP communication traffic to the FA module 212 while omitting processing by the NAT module 212. For Mobile IP communication traffic received at the LAN I/F 112, the FA module 212 encapsulates the traffic from the mobile device 102 with IP header containing CoA address for IP-to-IP tunneling to the HA 110 out of the WAN I/F 118 without involving the NAT module 210.

In one embodiment, the control module 211 classifies LAN-side Mobile IP communication traffic based on the home address of the mobile device 102. The home address of the mobile device 102 is learned during registration by the FA module 212 from the home address field in registration request and reply messages. The control module 211 is configured to forward to the FA module 212 traffic received at the LAN I/F 112 having the home address of the mobile device 102 as the source address. Processing of such traffic by the NAT module 210 is omitted.

For Mobile IP traffic received at the WAN I/F 118, the control module 211 is configured to pass the Mobile IP registration traffic to the FA module 212 while omitting processing by the NAT module 212. The FA module 212 decapsulates the traffic from the HA 110 (stripping off the outer IP header) and forward it to the mobile device 102 on the LAN 104 without involving the NAT module 210.

In one embodiment, the control module 211 classifies WAN-side Mobile IP registration traffic with outer source IP address of the HA 110 as learned from home agent field in registration request and reply messages. The control module 211 is configured to forward to the FA module 212 traffic received at the WAN I/F 118 having the HA 110 address for the outer-header source IP address. Processing of such traffic by the NAT module 210 is omitted.

In one embodiment, the FA module 212 also includes a WAN-side filter to prevent traffic from any WAN source other that the HA 110 from reaching the mobile device 102. Notably, the FA module 212 prevents any WAN traffic from reaching the mobile device 102 until the FA module 212 receives a Mobile IP registration request from the mobile device 102. Upon receipt of the registration request from the mobile device 102 on the LAN-side, the FA module 212 establishes a WAN-side filter that only allows traffic to be received from the source IP address of the HA 110 in the registration request. If Mobile IP registration is successful, the FA module 212 will keep the filter open. The filter can remain open for the length of the Mobile IP session with the HA 110.

Figure 4:
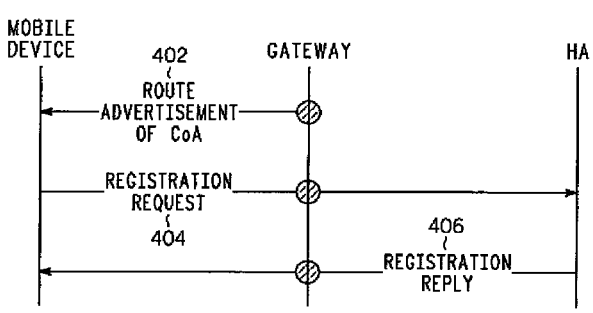
FIG. 4 is flow diagram depicting an exemplary embodiment of the flow of messages between a mobile device, a gateway, and a home agent during a registration process in accordance with one or more aspects of the invention To facilitate understanding, identical reference numerals have been used, where possible, to designate identical elements that are common to the figures.

FIG. 4 is flow diagram depicting an exemplary embodiment of the flow of messages between the mobile device 102, the gateway 106, and the HA 110 during the registration process in accordance with one or more aspects of the invention. An advertisement message of the CoA address of the FA module 212 is sent from the gateway 106 to the mobile device 102 in step 402. Then a registration request is transmitted from the mobile device 102 to the HA 110 via the gateway 106 in step 404. Subsequently, the HA 110 transmits a registration reply to the mobile device 102 via the gateway 106 in step 406. Notably, the circles in FIG. 4 represent FA processing only (no NAT function processing).

It should be noted that the approach of the invention requires an additional global address assignment at the gateway 106 only if a unique CoA address is desired. This is by no means required as noted previously. A key advantage of this invention is that no modification of the mobile device 102 or the HA 110 is needed. This is in contrast to other techniques, such as the tunnel protocol described in IETF RFC 3519, where mobile device, foreign agent (if used), and home agent must be modified to support the protocol.

An aspect of the invention is implemented as a program product for use with a computer system. Program(s) of the program product defines functions of embodiments and can be contained on a variety of signal-bearing media (computer readable media), which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information stored on a storage medium as a result of having been conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

Method and apparatus for providing Mobile internet protocol (IP) service through a network address translation gateway has been described. Packets received by the gateway are inspected to identify whether each packet is mobile IP traffic or other traffic. Mobile IP traffic is processed by an FA module, and other traffic is processed by a NAT module. In this manner, network address translation of mobile IP traffic is advantageously omitted. This allows the IP-in-IP tunnels used by mobile IP to pass through the gateway.

While various embodiments have been described above, it should be understood that they are presented by way of example only, and not limiting. For example, although the invention disclosed herein was discussed in connection with mobile IP services in the exemplary embodiments, one skilled in the art would recognize that the method and system disclosed herein can also be used in connection with other forms of wireless communication. Thus, the breadth and scope of a preferred embodiment should not be limited by any of the above-described exemplary embodiments, but should be defined only in accordance with the following claims and their equivalents.

What is claimed is:

1. Apparatus for providing a gateway between a local area network and a wide area network, comprising:
   a network address translation (NAT) module embodied in hardware, wherein the NAT module is configured to provide network address translation for the gateway;
   a foreign agent module embodied in hardware for advertising a care-of address on the local area network and processing registration and mobile internet protocol (IP) communication traffic on the local area network and the wide area network; and
   a control module embodied in hardware for identifying the registration and the mobile IP communication traffic to omit processing thereof by the network address translation module, thereby omitting network address translation by the network address translation module for the registration and mobile IP communication traffic, and processing the registration and the mobile IP communication traffic by the foreign agent module, wherein the control module comprises a filter module embodied in hardware configured to filter traffic from the local area network and the wide area network to provide the registration and the mobile IP communication traffic to the foreign agent module and to provide remaining traffic to the network address translation module.

2. The apparatus of claim 1, wherein the care-of address is a wide area network-side IP address of the gateway or a separate wide area network-side IP address statically or dynamically assigned to the foreign agent module.

3. The apparatus of claim 1, wherein the foreign agent module is configured to:
   receive registration request messages from mobile devices through the local area network;
   alter a source IP address and a port of each of the registration request messages to correspond to a wide area network interface for the foreign agent module; and
   forward the registration request messages to home agents through the wide area network;
   and wherein the control module is configured to:
   identify the registration request messages as mobile IP messaging traffic based on destination port value; and
   forward the registration request messages to the foreign agent module to the exclusion of the network address translation module.

4. The apparatus of claim 3, wherein the foreign agent module is further configured to:
   receive registration reply messages from the home agents over the wide area network;
   alter a destination IP address and a port of each of the registration reply messages to a local area network interface of a corresponding one of the mobile devices;
   and wherein the control module is further configured to:
   identify the registration reply messages as mobile IP messaging traffic based on destination port value; and
   forward the registration reply messages to the foreign agent module to the exclusion of the network address translation module.

5. The apparatus of claim 1, wherein the foreign agent module is configured to:
   receive first mobile IP communication traffic from mobile devices over the local area network;
   encapsulate the first post registration traffic with an IP header containing the care-of address for IP-to-IP tunneling through the wide area network to home agents;
   and wherein the control module is configured to:
   identify the first mobile IP communication traffic as mobile IP traffic based on source address being home addresses of the mobile devices; and
   forward the first mobile IP communication traffic to the foreign agent module to the exclusion of the network address translation module.

6. The apparatus of claim 5, wherein the foreign agent module is further configured to:

receive second mobile IP communication traffic from the home agents over the wide area network;

decapsulate the second post registration traffic; and forward the second post registration traffic to the mobile devices on the local area network;

and wherein the control module is further configured to:

identify the second mobile IP communication traffic as mobile IP traffic based on source address; and forward the second mobile IP communication traffic to the foreign agent module to the exclusion of the network address translation module.

7. The apparatus of claim 1, wherein the foreign agent module is configured to establish a filter for the wide area network.

8. A method of providing a gateway between a local area network and a wide area network, the gateway having a foreign agent module and a network address translation (NAT) module, the method comprising:

inspecting packets received from the wide area network and the local area network to identify whether each of the packets is registration mobile internet protocol (IP) traffic, mobile IP communication traffic, or other traffic;

processing the registration mobile IP traffic and the mobile IP communication traffic via the foreign agent module and not processing the registration mobile IP traffic via the network address translation module; and processing the other traffic via the network address translation module, wherein network address translation is omitted for the registration mobile IP traffic and the mobile IP communication traffic, wherein the NAT module is configured to provide network address translation for the gateway, and further, wherein the step of inspecting comprises filtering traffic from the local area network and the wide area network to provide the registration mobile IP traffic and the mobile IP communication traffic to the foreign agent module and to provide the other traffic to the network address translation module.

9. The method of claim 8, further comprising:

advertising a care-of address on the local area network via the foreign agent module;

wherein the care-of address is a wide area network-side IP address of the gateway or a separate wide area network-side IP address statically or dynamically assigned to the foreign agent module.

10. The method of claim 9, wherein the step of processing via the foreign agent module comprises:

receiving a registration request message from a mobile device through the local area network;

altering a source IP address and a port of the registration request message to correspond to a wide area network interface for the foreign agent module; and forwarding the registration request message to a home agent through the wide area network;

and wherein the step of inspecting comprises:

identifying the registration request message as mobile IP messaging traffic based on destination port value; and forwarding the registration request message to the foreign agent module to the exclusion of the network address translation module.

11. The method of claim 10, wherein the step of processing via the foreign agent module further comprises:

receiving a registration reply message from the home agent over the wide area network; and altering a destination IP address and a port of the registration reply message to a local area network interface of the mobile device;

and wherein the step of inspecting further comprises:

identifying the registration reply message as mobile IP messaging traffic based on destination port value; and forwarding the registration reply message to the foreign agent module to the exclusion of the network address translation module.

12. The method of claim 9, wherein the step of processing via the foreign agent module comprises:

receiving first mobile IP communication traffic from a mobile device over the local area network; and encapsulating the first mobile IP communication traffic with an IP header containing the care-of address for IP-to-IP tunneling through the wide area network to a home agent;

and wherein the step of inspecting comprises:

identifying the first mobile IP communication traffic as mobile IP traffic based on source address being a home address of the mobile device; and forwarding the first mobile IP communication traffic to the foreign agent module to the exclusion of the network address translation module.

13. The method of claim 12, wherein the step of processing via the foreign agent module further comprises:

receiving second mobile IP communication traffic from the home agent over the wide area network;

decapsulating the second mobile IP communication traffic; and forwarding the second mobile IP communication traffic to the mobile device on the local area network and wherein the step of inspecting further comprises:

identifying the second mobile IP communication traffic as mobile IP traffic based on source address; and forwarding the second mobile IP communication traffic to the foreign agent module to the exclusion of the network address translation module.

14. The method of claim 8, further comprising:

establishing a filter for the wide area network.

15. A non-transitory computer readable storage medium having stored thereon instructions that, when executed by a processor, cause the processor to perform a method of providing a gateway between a local area network and a wide area network, the gateway having a foreign agent module and a network address translation (NAT) module, the method comprising:

inspecting packets received from the wide area network and the local area network to identify whether each of the packets is registration mobile internet protocol (IP) traffic, mobile IP communication traffic, or other traffic;

processing the registration mobile IP traffic and the mobile IP communication traffic via the foreign agent module and not processing the registration mobile IP traffic via the network address translation module; and processing the other traffic via the network address translation module, wherein network address translation is omitted for the registration mobile IP traffic and the mobile IP communication traffic, wherein the NAT module is configured to provide network address translation for the gateway, and further, wherein the step of inspecting comprises filtering traffic from the local area network and the wide area network to provide the registration mobile IP traffic and the mobile IP communication traffic to the foreign agent module and to provide the other traffic to the network address translation module.

16. The computer readable medium of claim 15, wherein the step of processing via the foreign agent module comprises:

receiving a registration request message from a mobile device through the local area network;

altering a source IP address and a port of the registration request message to correspond to a wide area network interface for the foreign agent module; and forwarding the registration request message to a home agent through the wide area network;

and wherein the step of inspecting comprises:

identifying the registration request message as mobile IP messaging traffic based on destination port value; and forwarding the registration request message to the foreign agent module to the exclusion of the network address translation module.

17. The computer readable medium of claim 16, wherein the step of processing via the foreign agent module further comprises:

receiving a registration reply message from the home agent over the wide area network; and altering a destination IP address and a port of the registration reply message to a local area network interface of the mobile device;

and wherein the step of inspecting further comprises:

identifying the registration reply message as mobile IP messaging traffic based on destination port value; and forwarding the registration reply message to the foreign agent module to the exclusion of the network address translation module.

18. The computer readable medium of claim 15, wherein the step of processing via the foreign agent module comprises:

receiving first mobile IP communication traffic from a mobile device over the local area network; and encapsulating the first mobile IP communication traffic with an IP header containing a care-of address for IP-to-IP tunneling through the wide area network to a home agent;

and wherein the step of inspecting comprises:

identifying the first mobile IP communication traffic as mobile IP traffic based on source address being a home address of the mobile device; and forwarding the first mobile IP communication traffic to the foreign agent module to the exclusion of the network address translation module.

19. The computer readable medium of claim 18, wherein the step of processing via the foreign agent module further comprises:

receiving second mobile IP communication traffic from the home agent over the wide area network;

decapsulating the second mobile IP communication traffic; and forwarding the second mobile IP communication traffic to the mobile device on the local area network and wherein the step of inspecting further comprises:

identifying the second mobile IP communication traffic as mobile IP traffic based on source address; and forwarding the second mobile IP communication traffic to the foreign agent module to the exclusion of the network address translation module.

* * * * *